United States Patent
Lin (10) Patent No.: US 10,393,366 B2
(45) Date of Patent: Aug. 27, 2019

(54) TORQUE WRENCH PROVIDED WITH ILLUMINATION STRUCTURE AND INDICATED GRADUATIONS

(71) Applicant: TORQUE-TECH PRECISION CO., LTD., Taichung (TW)

(72) Inventor: Tien-Lung Lin, Taichung (TW)

(73) Assignee: TORQUE-TECH PRECISION CO., LTD., Taichung (TW)

( * ) Notice: Subject to any disclaimer, the term of this patent is extended or adjusted under 35 U.S.C. 154(b) by 11 days.

(21) Appl. No.: 15/694,367

(22) Filed: Sep. 1, 2017

(65) Prior Publication Data
US 2019/0072269 A1    Mar. 7, 2019

(51) Int. Cl.
| | |
|---|---|
| *B25B 23/142* | (2006.01) |
| *F21V 33/00* | (2006.01) |
| *B25G 1/10* | (2006.01) |
| B25B 23/18 | (2006.01) |
| G01D 13/28 | (2006.01) |

(52) U.S. Cl.
CPC ...... *F21V 33/0084* (2013.01); *B25B 23/1427* (2013.01); *B25G 1/105* (2013.01); *B25B 23/18* (2013.01); *F21V 33/008* (2013.01); *G01D 13/28* (2013.01)

(58) Field of Classification Search
CPC .............. F21V 33/0084; F21V 33/008; B25B 23/1427; B25B 23/141; B25B 23/14; B25B 23/142; B25B 13/48; B25B 23/18; B25G 1/105; G01D 13/28; G01D 13/22

USPC ......... 362/23.11, 23.12, 23.13, 23.18, 23.19, 362/23.2
See application file for complete search history.

(56) References Cited

U.S. PATENT DOCUMENTS

| | | | | |
|---|---|---|---|---|
| 6,968,759 B2* | 11/2005 | Becker | ................ | B25B 23/1425 73/862.23 |
| 7,493,830 B2* | 2/2009 | Escoe | ................ | B25B 23/1425 73/862.21 |
| 7,562,589 B2* | 7/2009 | Anjanappa | .......... | B25B 23/1425 73/862.21 |
| 8,443,703 B2* | 5/2013 | Chen | ........................ | G01L 5/24 73/862.23 |
| 2009/0165608 A1* | 7/2009 | Li | ....................... | B25B 23/1422 81/467 |
| 2011/0192235 A1* | 8/2011 | Hsu | ..................... | B25B 23/1425 73/862.23 |

(Continued)

*Primary Examiner* — Monica S Carter
*Assistant Examiner* — Danny Hong
(74) *Attorney, Agent, or Firm* — Sinorica, LLC (57) ABSTRACT

A torque wrench provided with illumination structure and indicated graduations includes a tubular body bored with an insert hole and an illumination hole. The tubular body is provided therein with a graduated ring having its outer circumferential wall provided with a graduation marked portion, with an interval kept between the graduation marked portion and the inner tube wall of the tubular body. A lens is disposed at a location corresponding to the insert hole, and a light-emitting element is installed at a location corresponding to the illumination hole. Thus, light emitted by the light-emitting element will first illuminate the graduation marked portion and thereafter the reflected light of the graduation marked portion will pass through the insert hole and pass out the lens, enabling a user to clearly read the graduation marked portion.

11 Claims, 10 Drawing Sheets

(56) References Cited

U.S. PATENT DOCUMENTS

2012/0132042 A1* 5/2012 Bruce ................ B25B 23/1425
  81/479

* cited by examiner

TORQUE WRENCH PROVIDED WITH ILLUMINATION STRUCTURE AND INDICATED GRADUATIONS

BACKGROUND OF THE INVENTION

1. Field of the Invention

This invention relates to a torque wrench provided with graduation and illumination structure.

2. Description of the Prior Art

Figure 1:
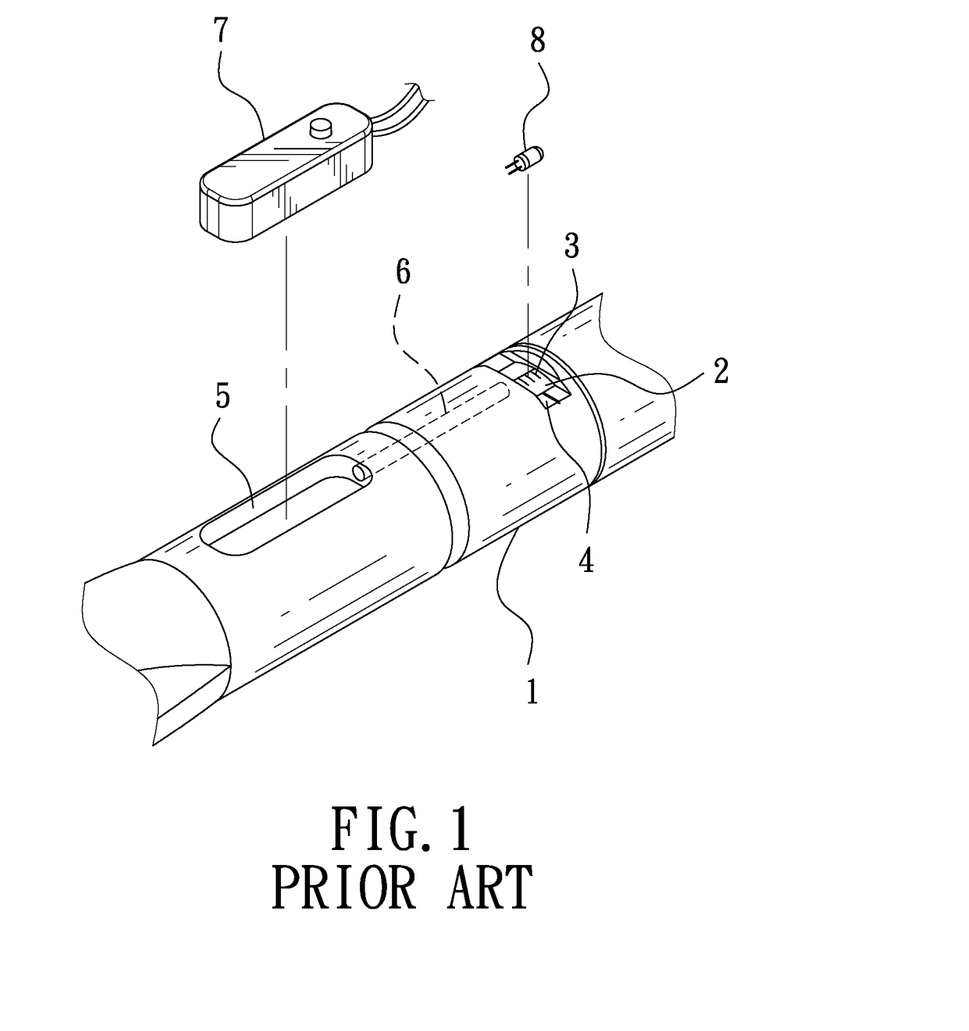
FIG. 1 is a partial exploded view of a conventional torque wrench.
Figure 2:
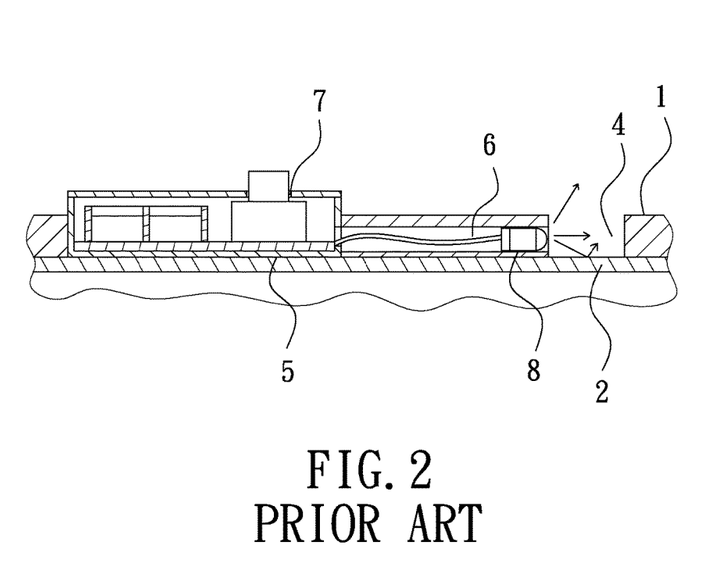
FIG. 2 is a partial cross-sectional view of the conventional torque wrench.

A conventional torque wrench provided with illumination structure, which was previously designed by the inventor of this invention, is disclosed in FIGS. 1 and 2. The torque wrench is formed with a main body 1 and a torque adjustment mechanism 2 received in the main body 1. The torque adjustment mechanism 2 is formed with a marked portion 3, such as a graduation indicator or a number rotating wheel set. The main body 1 has its outer surface provided with a viewing window 4 corresponding with the marked portion 3 and further bored with a control groove 5 and a passageway 6 communicating with both the control groove 5 and the viewing window 4. A control unit 7 is installed in the control groove 5 and connected with an LED 8, which is inserted in the passageway 6 and set at a location adjacent to the viewing window 4. Thus, when a user starts the control unit 7 to actuate the LED 8 to emit light, the light emitted by the LED 8 will illuminate the marked portion 3 to enable the user to recognize and read the graduations in surroundings of insufficient light.

However, since the passageway 6 is directly communicating with the viewing window 4; therefore, when the LED 8 begins emitting light, a part of the light will be reflected out of the viewing window 4 to form reflected light, while another part of the light will directly pass out the viewing window 4. In this case, when watching the graduations, the user will see both the reflected light of the marked portion 3 and the direct light coming from the LED 8 at the same time. Since light directivity of the LED 8 is extremely strong and the excessively strong direct light will make a user's eyes produce direct glare; therefore, the user can hardly read the marked portion 3, particularly because the marked portion 3 itself is unable to emit light. The drawbacks of the conventional torque wrench provided with illumination structure as described above are manifest.

SUMMARY OF THE INVENTION

The objective of this invention is to offer a torque wrench provided with illumination structure and indicated graduations, able to let light first illuminate a graduation marked portion and simultaneously the reflected light of the graduation marked portion will pass through an insert hole, thus ensuring that most light is reflected out of the interior of the insert hole and very rare to produce interference light.

The torque wrench provided with illumination structure and indicated graduations in the present invention includes a tubular body formed with an outer tube wall and an inner tube wall. The outer tube wall is radially bored with at least one insert hole passing through the inner tube wall and further radially bored with at least one illumination hole at a location adjacent to the insert hole. The illumination hole is bored from the outer tube wall toward the insert hole but does not directly communicate with the insert hole. The tubular body is disposed therein with a graduated ring having its circumferential wall provided with a graduation marked portion, with an interval kept between the graduation marked portion and the inner tube wall of the tubular body for making up a light passageway to connect the illumination hole, the interval and the insert hole. The torque wrench of this invention is further installed with a lens at a location corresponding with the insert hole, and a light-emitting element at a location corresponding to the illumination hole.

The illumination hole of torque wrench of this invention is bored from the outer tube wall toward the insert hole but does not directly communicate with the insert hole. The illumination hole can indirectly communicate with the insert hole via the light passageway formed between the graduation marked portion and the inner tube wall of the tubular body. Therefore, after a user starts the light-emitting element, light emitted by the light-emitting element can pass through the illumination hole and the interval toward the graduation marked portion and simultaneously, the reflected light of the graduation marked portion will pass through the insert hole and shine out of the lens to enable a user to clearly read the graduation marked portion.

BRIEF DESCRIPTION OF DRAWINGS

This invention will be better understood by referring to the accompanying drawings, wherein.

DETAILED DESCRIPTION OF THE PREFERRED EMBODIMENT

Figure 3:
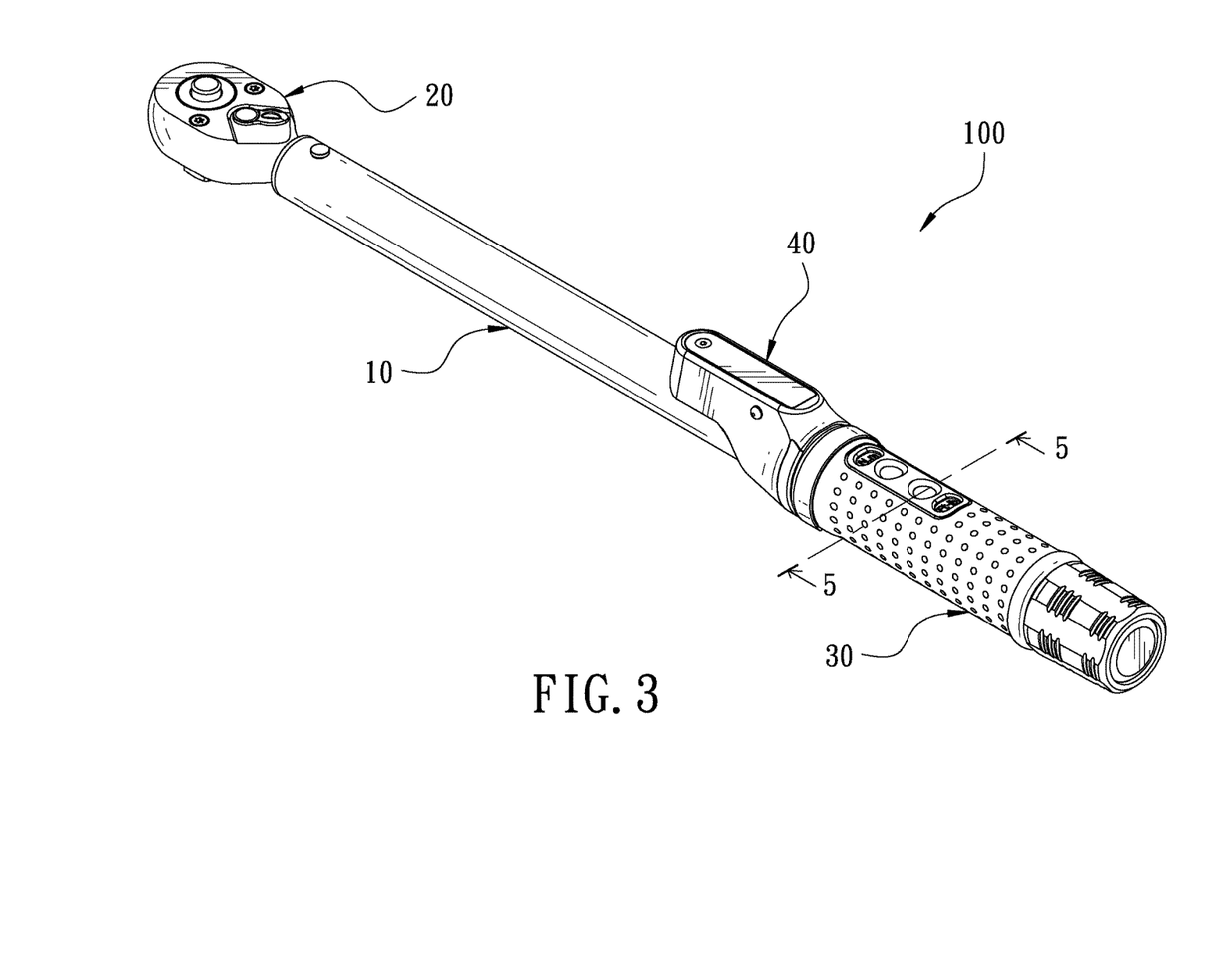
FIG. 3 is a perspective view of a first preferred embodiment of a torque wrench provided with illumination structure and indicated graduations in the present invention.

A first preferred embodiment of a torque wrench 100 provided with illumination structure and indicated graduations in the present invention, as shown in FIG. 3, includes a tubular body 10, a driving head 20 provided at one end the tubular body 10, a grip 30 fixed at another end of the tubular body 10, and a control unit 40.

Figure 4:
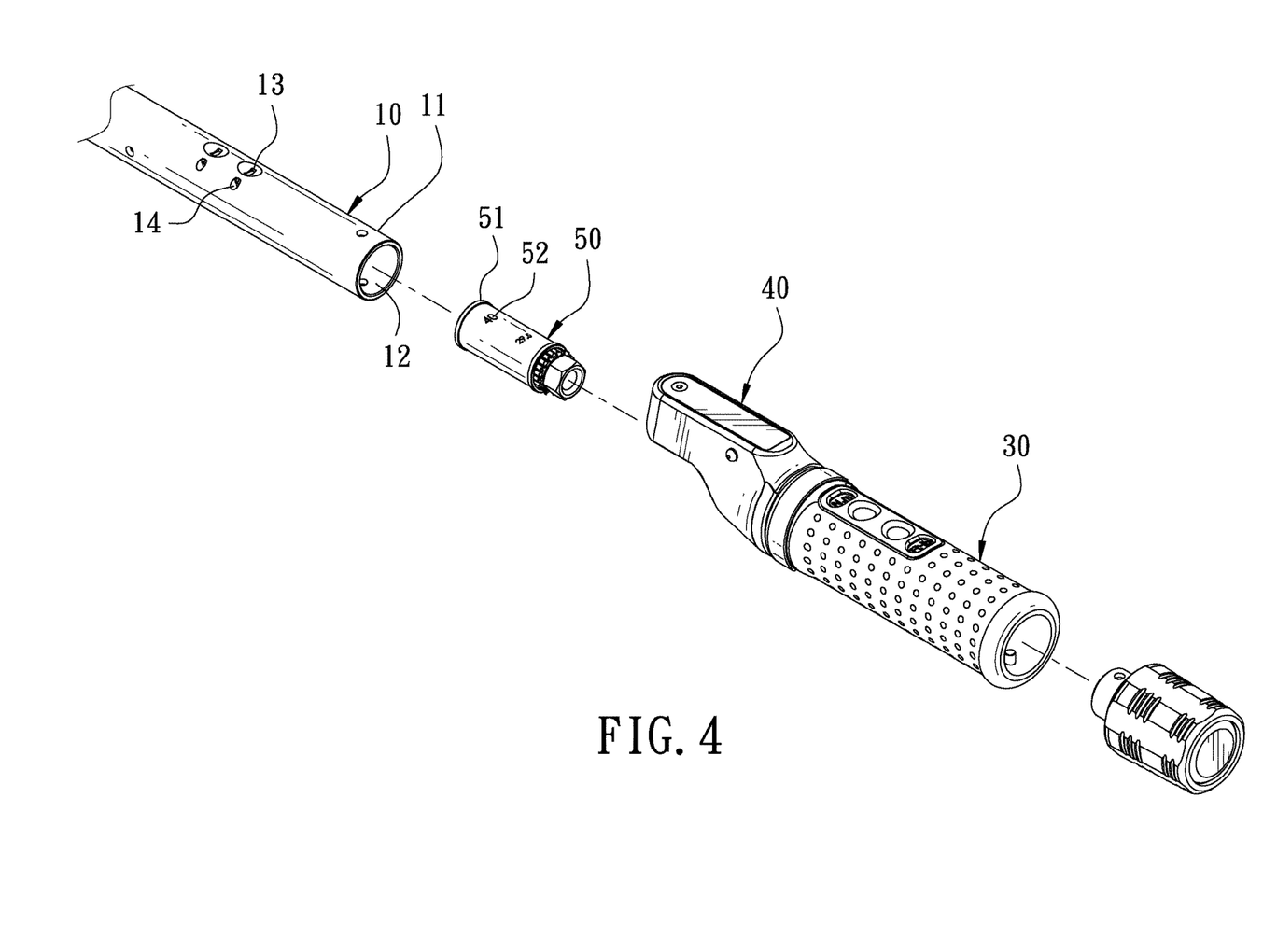
FIG. 4 is a partial exploded perspective view of the first preferred embodiment of the torque wrench provided with illumination structure and indicated graduations in the present invention.
Figure 5:
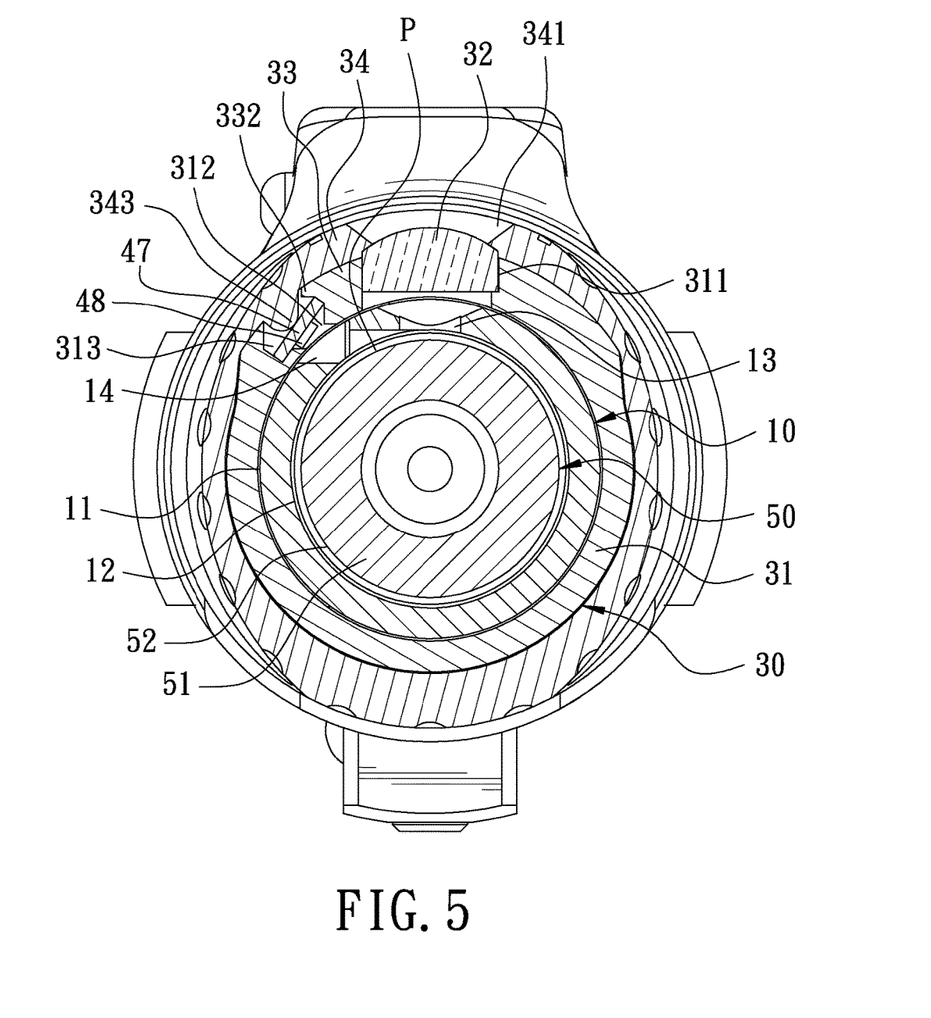
FIG. 5 is a cross-section view taken along line 5-5 of FIG. 3.

Referring to FIGS. 4 and 5, the tubular body 10 is oppositely formed with an outer tube wall 11 and an inner tube wall 12. The outer tube wall 11 is radially bored with at least one insert hole 13 passing through the inner tube wall 12 and further radially bored with an illumination hole 14 passing through the inner tube wall at a location adjacent to the insert hole 13. The illumination hole 14 is bored from the outer tube wall toward the insert hole 13 but does not directly communicate with the insert hole 13. In this preferred embodiment, the tubular body 10 is disposed with two insert holes 13 and two illumination holes 14 spaced apart with each other.

In addition, the tubular body 10 is provided therein with a torsion adjustment mechanism 50, which is formed with a graduated ring 51 received in the interior of the tubular body 10 at a location corresponding to the insert hole 13. The graduated ring 51 has its outer wall provided with a graduation marked portion 52 whose graduations can be visible through the insert hole 13, and an interval is kept between the graduation marked portion 52 and the inner tube wall 12 of the tubular body 10 for forming a light passageway (P) connecting the insert hole 13, the interval and the illumination hole 14.

Figure 6:
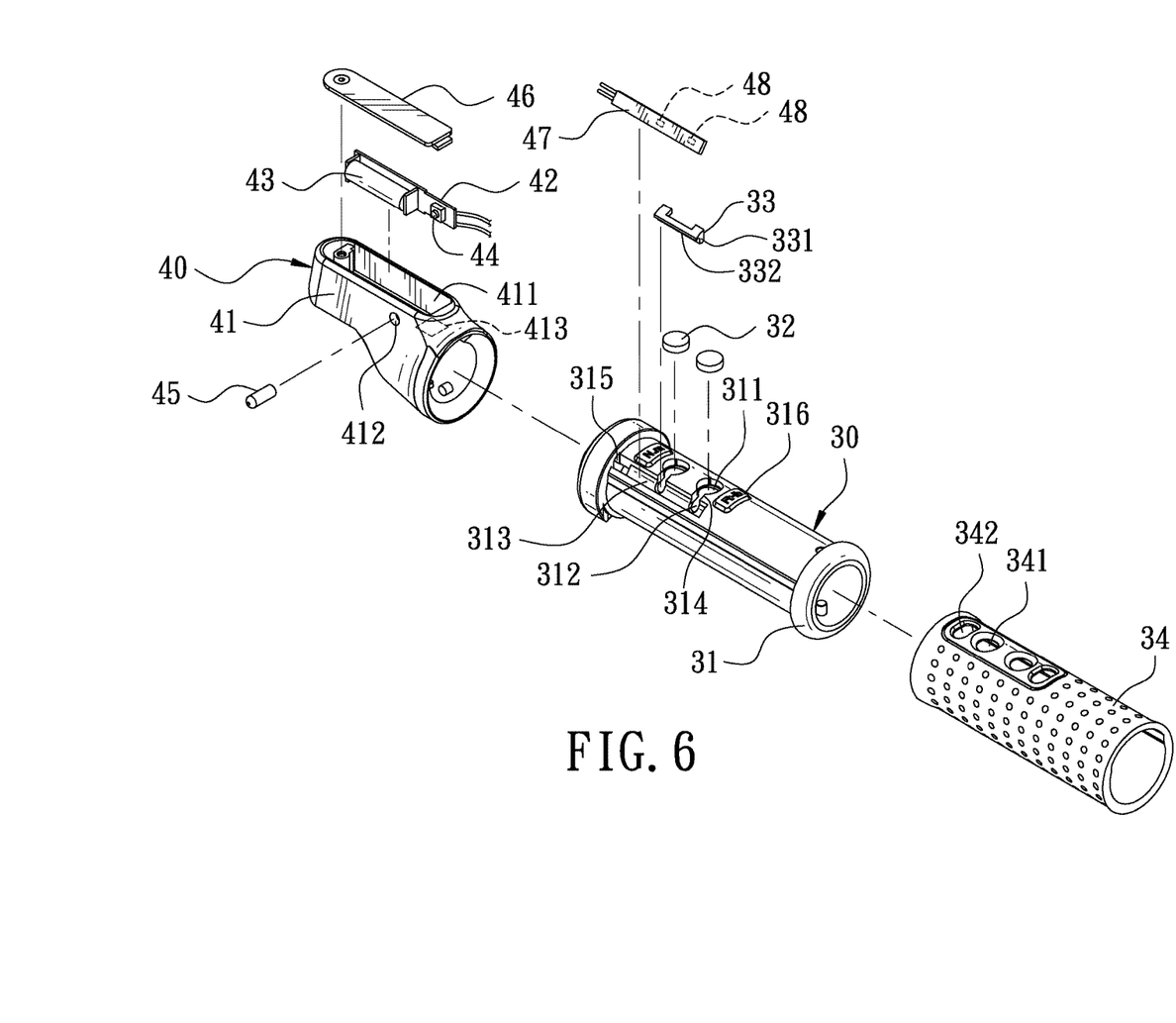
FIG. 6 is an exploded perspective view of the first preferred embodiment of a grip and a control unit in the present invention.

Referring to FIGS. 5 and 6, the grip 30 is formed with a sleeve 31 to be fitted around the tubular body 10. The sleeve 31 is provided with a first communication hole 311 corresponding to the insert hole 13, a second communication hole 312 corresponding to the illumination hole 14, and a communication groove 313 communicating with the second communication hole 312. The sleeve 31 is further disposed with at least one accommodating groove 314 communicating with both the first communication hole 311 and the communication groove 313 at a location between the first communication hole 311 and the communication groove 313, and further bored with a first connecting hole 315 communicating with the communication groove 313 and also communicating with the second communication hole 312 via the communication groove 313. A unit marked portion 316 is mounted at a location adjacent to the first communication hole 311, a lens 32 is installed in the first communication hole 311 to enable a user to watch magnified graduations of the graduation marked portion 52 via the lens 32 and at least one stopper 33 is received in the communication groove 314. In addition, the grip 30 is provided with a grip bushing 34 to be fitted around the sleeve 31, and the grip bushing 34 is provided with a viewing window 341 corresponding with the first communication hole 311 and bored with an opening 342 corresponding to the unit marked portion 316.

The control unit 40 is formed with a fixed seat 41 to be fitted with the tubular body 10. The fixed seat 41 is provided with a control groove 41 communicating with the communication groove 313, and a control panel 42 is received in the control groove 411 and disposed thereon with a power source 43 and a control member 44. The power source can be a battery and the control member can be a push switch. The fixed seat 41 is further bored with a sliding hole 412 communicating with the control groove 411, and the central axis of the sliding hole 412 is perpendicular to the central axis of the insert hole 13. A press button 45 is slidably installed in the sliding hole 412 and connected with the control member 44 for controlling the control member 44 to start and stop operation, having a part protruding out of the sliding hole 412. Moreover, the control groove 411 of the control unit 40 is covered thereon with a cover plate 46, and the fixed seat 41 is bored with a second connecting hole 413 communicating with both the first connecting hole 315 and the control groove 411. The control unit 40 is further provide with a circuit bored 47 received in the communication groove 313 of the grip 30 and electrically connected with the control panel 42 by power line inserted through both the first connecting hole 315 and the second connecting hole 413. The circuit board 47 is installed thereon with at least one light-emitting element 48, which is inserted in the second communication hole 312 at a location corresponding to the illumination hole 14. The axial irradiation of the light-emitting element 48 passes through the illumination hole 14 and the interval toward the graduation marked portion 52. In this preferred embodiment, the control unit 40 has two light-emitting elements 48 provided at locations respectively corresponding to the two illumination holes 14, and each light-emitting element 48 is an LED.

Figure 7:
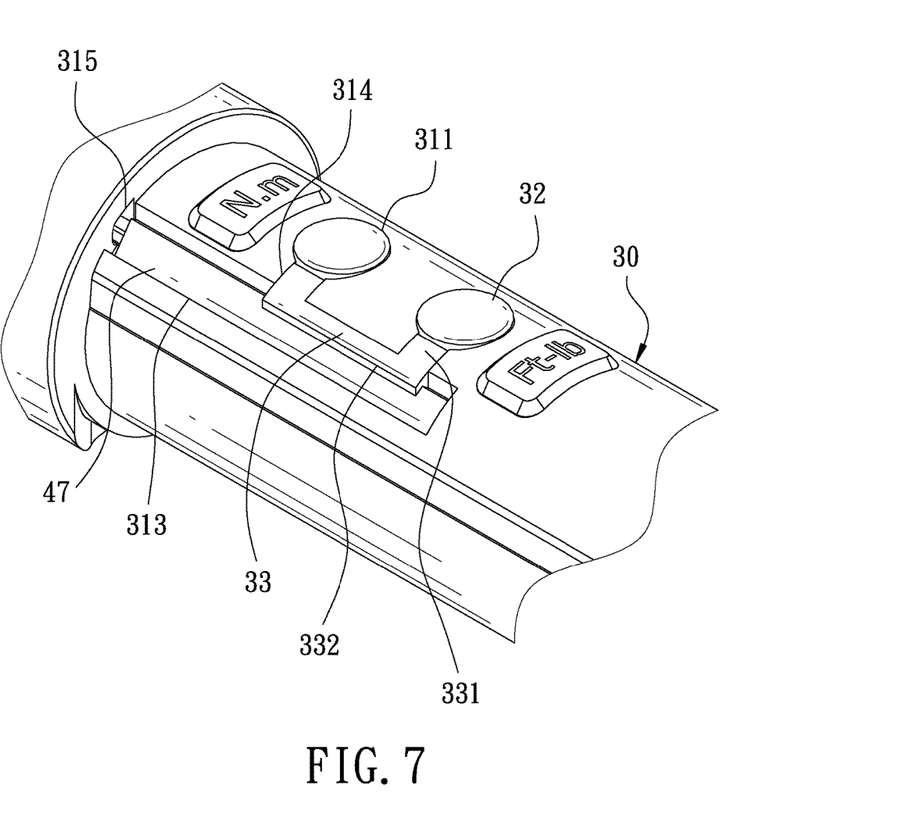
FIG. 7 is a partial magnified view of the grip in the present invention.

Referring to FIGS. 6 and 7, the shape of the circuit board 47 corresponds with the shape of the communication groove 313 so that the circuit board 47 can be exactly inlaid and fixed in the communication groove 313 and is incapable of moving horizontally, and the stopper 33 is formed with a concealed portion 331 received in the accommodating groove 314 and provided with a resisting member 332 protruding out toward the communication groove 313 for resisting against the outer side of the circuit board 47 to have the circuit board 47 restrictedly positioned in the communication groove 313. In this preferred embodiment, the grip 30 comprises two first communication holes 311, the grip 30 is disposed with two accommodating grooves 314, each of the accommodating grooves 314 is positioned respectively between each of the first communication holes 311 and the communication groove 313, and the stopper 33 is provided with two concealed portions 331, each of the concealed portions 331 corresponding to each of the accommodating grooves 314 to be received in each of the accommodating grooves 314, and further the resisting member 332 is connected between the concealed portions 331. Referring to FIG. 5 once again, the grip bushing 34 has its inner side wall provided with a protruding press member 343 corresponding to the communication groove 313 so that, when the grip bushing 34 is fitted around the grip 30, the press member 343 can exactly resist and press the circuit board 47. Thus, the circuit board 47 can be effectively fixed in the communication groove 313 by foresaid structure.

Figure 8:
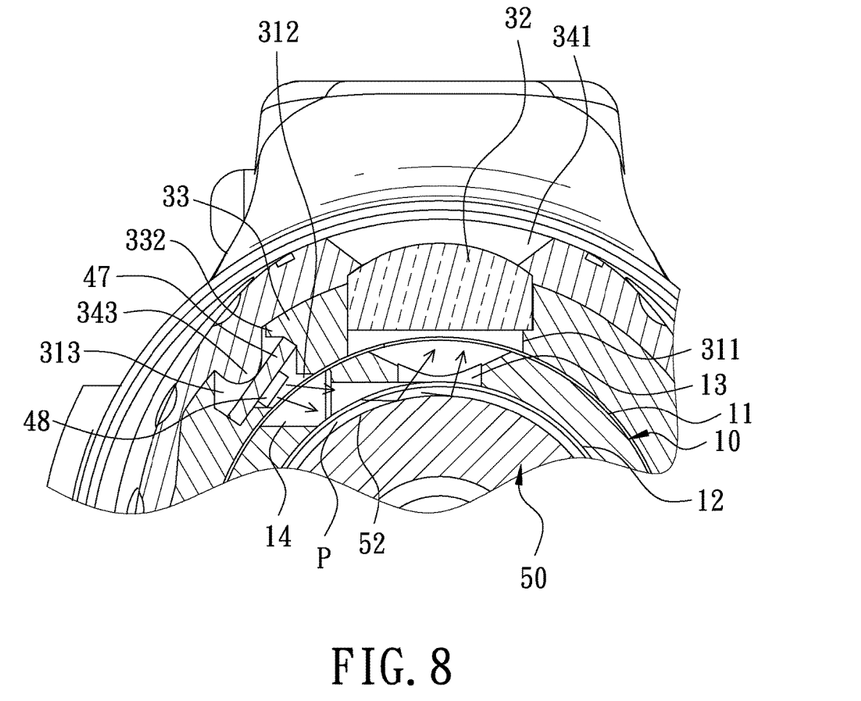
FIG. 8 is a schematic view of light advancing route in the present invention.
Figure 9:
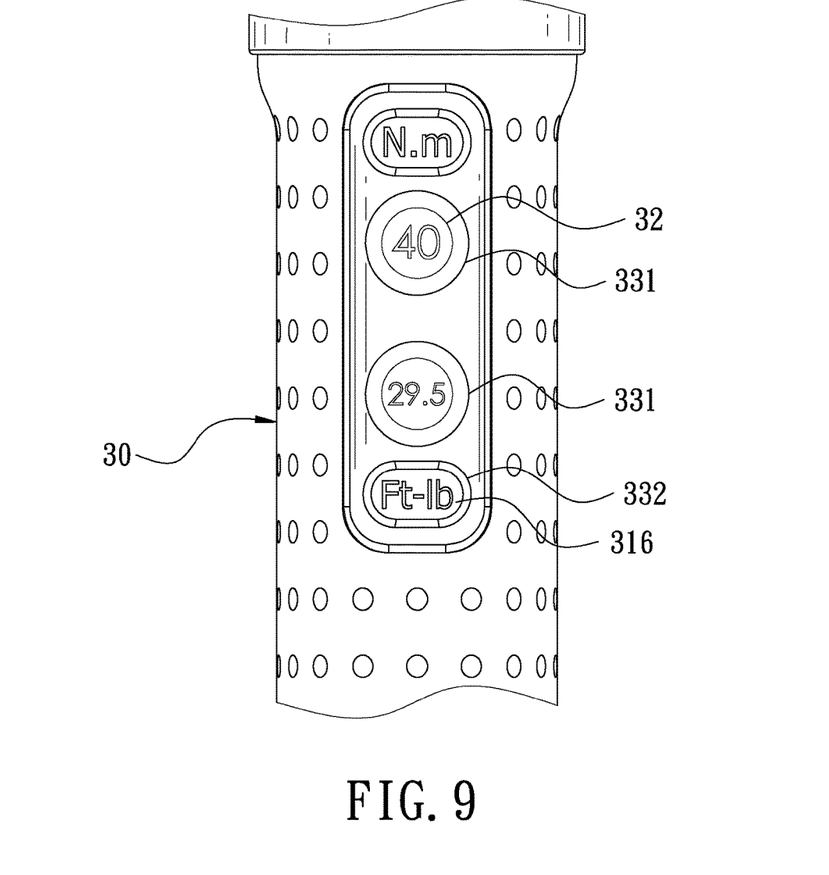
FIG. 9 is a schematic view of the torque wrench provided with illumination structure and indicated graduations in use in the present invention.

In use, referring to FIGS. 8 and 9, after a user presses the press button 45 to start the control member 44, the control member 44 will control the power source 43 to begin supplying electricity to the circuit board 47 for starting the light-emitting element 48 to emit light. At this time, since the illumination hole 14 is board from the outer tube wall 11 toward the insert hole 13 but does not directly communicate with the insert hole 13, and the illumination hole 14 indirectly communicates with the insert hole 13 via the light passageway (P) formed between the graduation marked portion 52 and the inner tube wall 12 of the tubular body 10, and the axial irradiation of the light-emitting element 48 faces the light passageway (P). Therefore, the light emitted by the light-emitting element 48 will first pass through the second communication hole 312 and through the illumination hole 14 and then get into the light passageway (P) for illuminating the graduation marked portion 52. Then, the light will be reflected by the graduation marked portion 52 and enter the insert hole and pass through the first communication hole 311 and the lens 32 and then pass out the viewing window 341. Thus, it can be ensured that most light is reflected from the interior of the insert hole 13 and thus, under the circumstances of no external light, the light of the light-emitting element 48 can illuminate the graduations directly beneath the lens 32 via the light passageway (P) and the graduations can be magnified by the lens 32, alternately, while under the circumferences of having external light, the light of the light-emitting element 48 transmitted by the light passageway (P) can effectively lessen scattered light produced when external light shines upon the surface of the lens 32 or shines into the lens, thus enabling a user to clearly read the graduation marked portion 52.

What is worthy of mentioning is that, in this preferred embodiment, the graduation marked portion 52 corresponding to one of the two insert holes 13 is provided with a set of values in Newton meter (Nm) as a unit, and corresponding to another insert hole 13 is provided with a set values in pound feet (lb-ft) as a unit, while the grip 30 corresponding with one of the two first communication holes 311 is provided with a unit marked portion 316 marked as Newton meter, and corresponding with another first communication hole 311 is provided with a unit marked portion 316 marked as pound feet, thus able to show values of two kinds of units for facilitating a user to read.

In addition, since the graduation marked portion 52 is generally marked with numbers; therefore in this invention, the insert hole 13 is formed into a rectangular hole for facilitating a user to have the insert hole 13 and the graduation marked portion 52 aligned with each other, letting the interior of the insert hole 13 only appear one set of values and enhancing easiness of interpretation.

Figure 10:
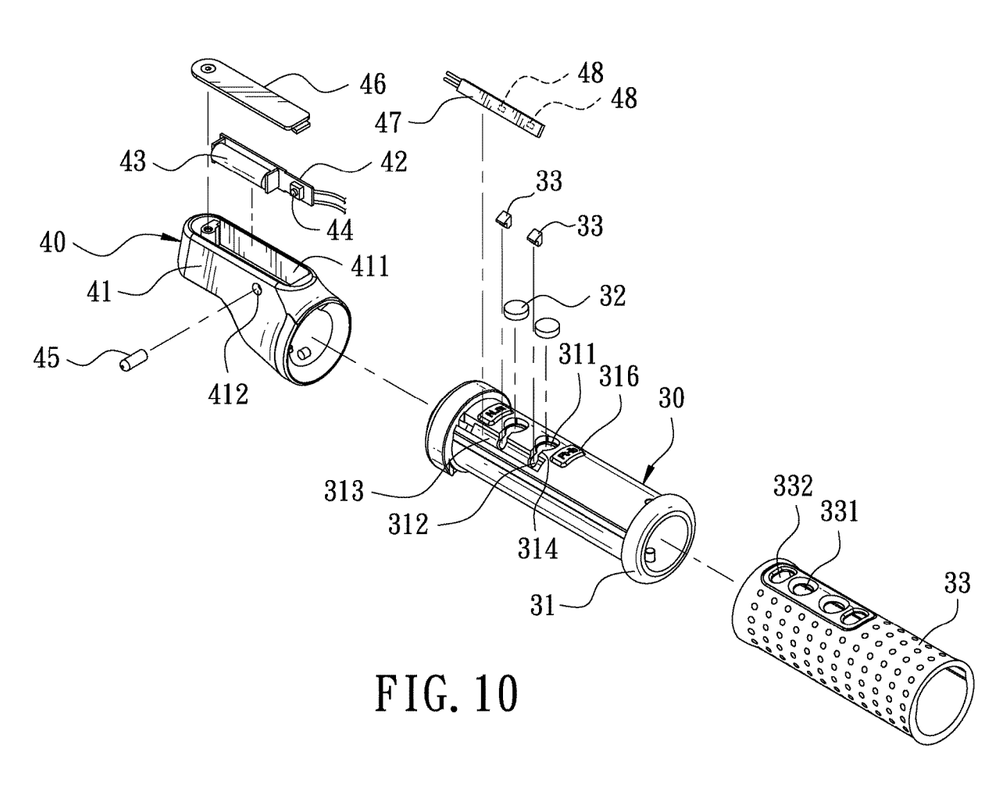
FIG. 10 is an exploded perspective view of a second preferred embodiment of a torque wrench provided with illumination structure and indicated graduations in the present invention.

A second preferred embodiment of a torque wrench provided with illumination structure and indicated graduations in the present invention, as shown in FIG. 10, has almost the same structure as that of the first preferred embodiment, except that the grip 30 is provided with an accommodating groove 314 between each first communication hole 311 and each communication groove 313, and each communicating groove 314 is received therein with the stopper 33, thus equally able to effectively fix the circuit board 47 in the communication groove 313.

While the preferred embodiments of the invention have been described above, it will be recognized and understood that various modifications may be made therein and the appended claims are intended to cover all such modifications that may fall within the spirit and scope of the invention.

What is claimed is:

1. A torque wrench provided with illumination structure and indicated graduations comprising a tubular body, said tubular body having one end installed with a driving head, said tubular body having another end combined with a grip, said tubular body further comprising a torque adjustment mechanism, said torque adjustment mechanism rotatably provided in said tubular body, and characterized by:

said tubular body formed with an outer tube wall and an inner tube wall, said outer tube wall radially bored with at least one insert hole passing through said inner tube wall and further radially bored with at least one illumination hole passing through said inner tube wall at a location adjacent to said insert hole, said illumination hole bored from said outer tube wall toward said insert hole but not directly communicating with said insert hole;

said torque adjustment mechanism formed with a graduated ring, said graduated ring provided at a location corresponding to said insert hole, said graduated ring having an outer circumferential wall annularly provided with at least one graduation marked portion, graduations of said graduation marked portion able to be revealed at said insert hole, wherein an interval kept between said graduation marked portion and said inner tube wall of said tubular body to form a light passageway for connecting said illumination hole and said interval and said insert hole;

said grip bored with at least one first communication hole corresponding to said insert hole, said first communication hole installed therein with a lens so that a user is able to watch magnified graduations of said graduation marked portion via said lens;

a control unit provided with at least one light-emitting element, said light-emitting element installed at a location corresponding to said illumination hole, wherein axial irradiation of said light-emitting element passing through said illumination hole and said interval toward said graduation marked portion, said light-emitting element electrically connected with a power source, said power source supplying electricity for actuating said light-emitting element to emit light, said light-emitting element electrically connected with a control member, said control member controlling said light-emitting element to start and stop operation;

thus, light emitted by said light-emitting element passing through said illumination hole and said interval toward said graduation marked portion after a user starts said light-emitting element, thereafter reflected light of said graduation marked portion passing through said insert hole and then passing out of said lens, under circumstances of no external light, light of said light-emitting element able to correspondingly illumine graduations directly beneath said lens via said light passageway to enable a user to clearly read the graduations, alternately under circumferences of having external light, light of said light-emitting element transmitted via said light passageway able to effectively lessen scattered light produced when external light shines upon the surface of said lens or shines into said lens, letting a user able to clearly read the graduations;

said grip being bored with at least one second communication hole corresponding to said illumination hole, said light-emitting element positioned in said second communication hole; and said grip being further provided with a communication groove communicating with said second communication hole, said control unit being provided with a circuit board received in said communication groove, said circuit board installed thereon with said light-emitting element, said light-emitting element positioned in said second communication hole.

2. The torque wrench provided with illumination structure and indicated graduations as claimed in claim 1, wherein a shape of said circuit board corresponds with a shape of said communication groove, said circuit board able to be exactly inlaid and fixed in said communication groove and incapable of moving horizontally.

3. The torque wrench provided with illumination structure and indicated graduations as claimed in claim 1, wherein said grip is disposed with at least one accommodating groove between said first communication hole and said communication groove and comprises at least one stopper, said stopper formed with a concealed portion to be received in said accommodating groove, said concealed portion provided with a resisting member protruding toward said communication groove, said resisting member pushing against an outer side of said circuit board to have said circuit board restrictedly positioned in said communication groove.

4. The torque wrench provided with illumination structure and indicated graduations as claimed in claim 1, wherein said grip comprises two first communication holes, said grip is provided with two accommodating grooves, each of the accommodating grooves is positioned respectively between each of said first communication holes and said communication groove, said grip further comprises a stopper, said stopper formed with two concealed portions, each of said concealed portions corresponding to each of said accommodating grooves, each of said concealed portions received in each of said accommodating grooves, a resisting member connected between said concealed portions, said resisting member pushing against an outer side of said circuit board to have said circuit board restrictedly positioned in said communication groove.

5. The torque wrench provided with illumination structure and indicated graduations as claimed in claim 1, wherein said grip comprises a grip bushing, said grip bushing fitted on said grip, said grip bushing formed with at least one viewing window, said viewing window corresponding with said lens, able to reveal graduations of said graduation marked portion.

6. The torque wrench provided with illumination structure and indicated graduations as claimed in claim 1, wherein said grip comprises a grip bushing, said grip bushing fitted around said grip, said grip bushing having an inner side wall provided with a protruding press portion, said press portion able to resist and press said circuit board when said grip bushing is fitted on said grip.

7. The torque wrench provided with illumination structure and indicated graduations as claimed in claim 5, wherein said grip has a surface formed with a unit marked portion, and said grip bushing is bored with an opening corresponding to said unit marked portion, said opening revealing said unit marked portion.

8. The torque wrench provided with illumination structure and indicated graduations as claimed in claim 6, wherein said grip has a surface formed with a unit marked portion, said grip bushing disposed with an opening corresponding to said unit marked portion, said opening used for showing said unit marked portion.

9. The torque wrench provided with illumination structure and indicated graduations as claimed in claim 1, wherein said grip is bored with a first connecting hole communicating with said communicating groove, and said control unit is formed with a fixed seat to be fitted on said tubular body, said fixed seat provided with a control groove and a second connecting hole communicating with both said first connecting hole and said control groove, said power source and said control member installed in said control groove and electrically connected with said light-emitting element via said second connecting hole and said first connecting hole.

10. The torque wrench provided with illumination structure and indicated graduations as claimed in claim 9, wherein said fixed seat is bored with a sliding hole communicating with said control groove, a central axis of said sliding hole being perpendicular to a central axis of said insert hole, said sliding hole installed therein with a press button, said press button connected with said control member for controlling said control member to start and stop operation, said press button partly protruding out of said sliding hole.

11. The torque wrench provided with illumination structure and indicated graduations as claimed in claim 9, wherein said control unit further comprises a cover plate, said cover plate covered on said control groove of said fixed seat and threadably combined with said fixed seat.

* * * * *